United States Patent
Waddell et al.

(10) Patent No.: US 8,210,544 B2
(45) Date of Patent: Jul. 3, 2012

(54) APPARATUS FOR PREVENTING INCORRECT INSTALLATION OF MACHINERY COMPONENTS TOGETHER

(75) Inventors: Simon Waddell, Oro Valley, AZ (US); Ed Down, Tucson, AZ (US); William Scherzinger, Oro Valley, AZ (US)

(73) Assignee: Honeywell International Inc., Morristown, NJ (US)

( * ) Notice: Subject to any disclaimer, the term of this patent is extended or adjusted under 35 U.S.C. 154(b) by 950 days.

(21) Appl. No.: 12/122,552

(22) Filed: May 16, 2008

(65) Prior Publication Data

US 2009/0285624 A1     Nov. 19, 2009

(51) Int. Cl.
*F16J 15/02* (2006.01)
*F02F 11/00* (2006.01)

(52) U.S. Cl. ............. 277/630; 277/598; 277/637

(58) Field of Classification Search .......... 277/598, 277/630, 637
See application file for complete search history.

(56) References Cited

U.S. PATENT DOCUMENTS

| | | | | |
|---|---|---|---|---|
| 1,771,596 A * | 7/1930 | Victor | | 277/598 |
| 2,462,762 A * | 2/1949 | Nardin | | 277/609 |
| 2,745,521 A * | 5/1956 | White | | 403/288 |
| 2,867,464 A * | 1/1959 | Crampton | | 277/598 |
| 3,108,818 A * | 10/1963 | Furstenburg | | 277/637 |
| 3,618,443 A * | 11/1971 | Fitzner | | 411/352 |
| 3,871,668 A | 3/1975 | Coker et al. | | |
| 3,976,406 A | 8/1976 | Sasaki | | |
| 4,552,389 A * | 11/1985 | Babuder et al. | | 285/379 |
| 4,648,607 A * | 3/1987 | Yamada et al. | | 277/598 |
| 4,784,396 A | 11/1988 | Scott et al. | | |
| 4,846,482 A * | 7/1989 | Blodgett et al. | | 277/591 |
| 5,044,641 A * | 9/1991 | Belter | | 277/598 |
| 5,083,801 A * | 1/1992 | Okano et al. | | 277/598 |
| 5,145,219 A * | 9/1992 | Babuder | | 285/330 |
| 5,203,576 A * | 4/1993 | Miyaoh et al. | | 277/598 |
| 5,333,884 A * | 8/1994 | Miyaoh et al. | | 277/598 |
| 5,366,261 A * | 11/1994 | Ohmi et al. | | 285/328 |
| 5,375,851 A * | 12/1994 | Mockenhaupt | | 277/598 |
| 5,529,313 A * | 6/1996 | Malks | | 277/598 |
| 5,730,448 A * | 3/1998 | Swensen et al. | | 277/630 |
| 5,758,910 A * | 6/1998 | Barber et al. | | 285/330 |
| 5,793,566 A * | 8/1998 | Scura et al. | | 360/97.02 |
| 6,216,823 B1 | 4/2001 | Wilson | | |
| 6,231,050 B1 * | 5/2001 | Raden | | 277/598 |

(Continued)

FOREIGN PATENT DOCUMENTS

EP      846 853 A1      6/1998

*Primary Examiner* — Alison Pickard
(74) *Attorney, Agent, or Firm* — Shimokaji & Assoc., PC (57) ABSTRACT

Apparatus for preventing incorrect installation of machinery components together includes a tab, pin and pin-receiving hole. The tab on the seal plate protrudes angularly from its periphery and laterally beyond it so as to prevent incorrect installation of two seal plates together in a faulty sealing relationship with machinery components by their tabs making interfering contact with one another producing a visible gap between the two seal plates. The pin is mounted on and protrudes axially from a surface of one machinery component facing the seal plate and prevents incorrect installation of the machinery components together in a faulty sealing relationship without the seal plate between them by the pin contacting the surface of the other machinery component and producing a gap between the machinery components. The hole extends through the seal plate to receive the pin within it when one seal plate is correctly installed between the machinery components.

11 Claims, 5 Drawing Sheets

U.S. PATENT DOCUMENTS

| | | | |
|---|---|---|---|
| 6,318,734 B1 * | 11/2001 | Boskamp | 277/598 |
| 6,435,517 B1 * | 8/2002 | Belter | 277/591 |
| 6,592,128 B2 | 7/2003 | White | |
| 6,609,717 B2 * | 8/2003 | Hinson | 277/598 |
| 6,722,665 B1 * | 4/2004 | Burkhart et al. | 277/637 |
| 7,168,971 B2 * | 1/2007 | Manson et al. | 439/271 |
| 7,306,235 B2 * | 12/2007 | Roberts et al. | 277/593 |
| 7,364,166 B2 * | 4/2008 | Yoakam et al. | 277/616 |
| 7,392,738 B2 | 7/2008 | Kim | |
| 7,586,227 B2 * | 9/2009 | Spaggiari | 310/85 |
| 7,775,770 B2 * | 8/2010 | Carbaugh | 416/155 |
| 7,850,055 B2 * | 12/2010 | Niblett et al. | 227/156 |
| 2005/0023768 A1 | 2/2005 | Adams et al. | |
| 2006/0290073 A1 * | 12/2006 | Peterson | 277/598 |
| 2009/0285624 A1 * | 11/2009 | Waddell et al. | 403/14 |

\* cited by examiner

APPARATUS FOR PREVENTING INCORRECT INSTALLATION OF MACHINERY COMPONENTS TOGETHER

BACKGROUND OF THE INVENTION

The present invention generally relates to installation of components of machinery in a sealing relationship with one another and, more particularly, to apparatus for preventing incorrect installation of the machinery components together without a seal plate or with two seal plates therebetween.

An auxiliary power unit for commercial and military aircraft typically includes a small gas turbine engine coupled to a generator or in some cases a starter generator (however, for purposes of brevity, hereinafter only the term "generator" will be used). The purpose of the auxiliary power unit is to provide electric and pneumatic power for aircraft systems while the aircraft is on the ground and in flight.

The gas turbine engine of a typical auxiliary power unit has three main sections—the power section, the load compressor and the gearbox. The power section is the gas generator portion of the engine, producing all the rotary main shaft power for the auxiliary power unit. The load compressor is generally a main shaft-mounted compressor that provides all pneumatic power for the aircraft. The gearbox transfers power from the main shaft of the engine to the oil-cooled generator for production of electrical power. Within the gearbox, power is also transferred to engine accessories, such as the fuel control unit, the lube module, and the cooling fan.

The generator is fitted to the gas turbine engine of the auxiliary power unit at the gearbox and typically is cooled by oil. The source of this oil is from the auxiliary power unit itself. These are called shared oil systems. In order to provide this supply of oil leak-free to the generator, a seal plate is installed between the gas turbine engine gearbox and the generator. If the seal plate is installed incorrectly, for example the seal plate is missing altogether or two or more seal plates are installed instead of only one, a substantial oil leak will occur, causing extreme damage to the auxiliary power unit due to loss of lubricating/cooling oil.

As can be seen, there is a need for an innovation to prevent incorrect installation of the seal plate between the machinery components of an auxiliary power unit in order to ensure a leak-free condition in the installation.

SUMMARY OF THE INVENTION

In one aspect of the present invention apparatus for preventing incorrect installation of a seal plate between components of machinery comprises a plurality of elements on the seal plate and one of the machinery components which interact with one another and with the one machinery component to prevent incorrect installation of two or more seal plates together in a faulty sealing relationship between respective adjacent facing surfaces of the machinery components and incorrect installation of no seal plate between the machinery components.

In another aspect of the present invention, in combination with machinery components adapted for installation together and a single seal plate adapted for installation between the machinery components such that opposite faces of the seal plate provide a sealing relationship with respective facing surfaces of the machinery components, apparatus for preventing an incorrect installation of the machinery components together with two or more of the seal plates installed therebetween comprises an angular tab rigidly attached on a peripheral edge of the seal plate having a bent configuration and predetermined length such that the tab protrudes radially outwardly from the peripheral edge of the seal plate and laterally past one of the opposite faces of the seal plate such that the tab overlies a peripheral portion of an adjacent one of the machine components and is contacted by a like angular tab on another seal plate due to an incorrect installation of two of the seal plates between the machinery components, the contact between the tabs preventing adjacent surfaces of the two seal plates from contacting one another in a faulty sealing relationship and instead producing a visible gap between the adjacent faces of the two seal plates.

In a further aspect of the present invention a seal plate for sealing between two machinery components comprises a body having a thin planar annular configuration and radially spaced apart inner and outer peripheral edges, a pair of oppositely facing seal faces defined on the body between its inner and outer peripheral edges, and an angular tab fixedly attached to and protruding outwardly from the outer peripheral edge on the body and laterally beyond one of its seal faces so as to prevents incorrect installation of two seal plates together due to interfering contact between the tabs of the two seal plates, thus avoiding a faulty sealing relationship between respective adjacent facing surfaces of the two machinery components.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides a plurality of elements which interact with one another and with machinery components to prevent an incorrect installation of a seal plate (or absence of a seal plate) with machinery components in a faulty sealing relationship. While an exemplary embodiment of these elements is illustrated and described herein in reference to a gearbox and a generator of an auxiliary power unit, it will be readily apparent to those of ordinary skill in the art that these elements may be utilized in other categories of machinery.

Figure 1:
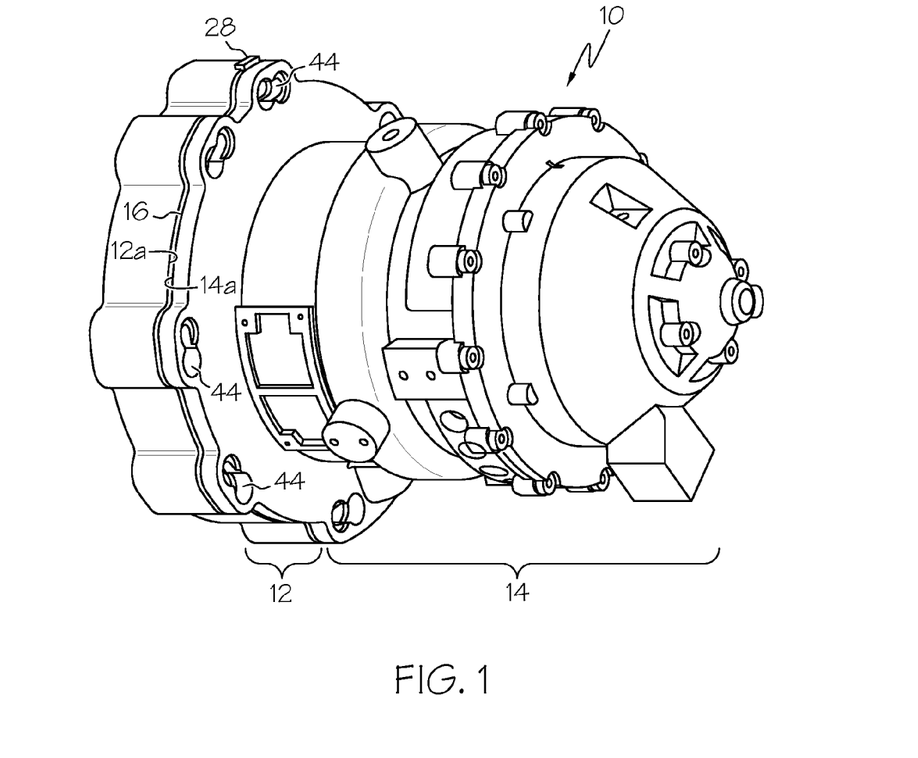
FIG. 1 is a perspective view of a portion of an auxiliary power unit having a single seal plate correctly installed between a gearbox and generator of the auxiliary power unit.
Figure 2:
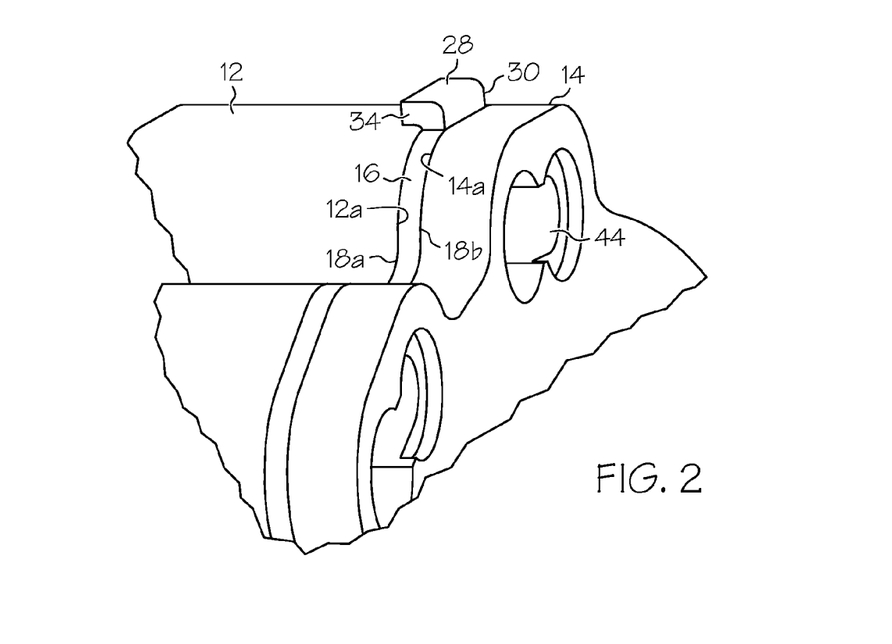
FIG. 2 is an enlarged fragmentary view of the auxiliary power unit in FIG. 1 in which one of a plurality of elements in accordance with the present invention is seen in a position indicative of the seal plate being correctly installed between the gearbox and generator of the unit.

In more specifically describing the present invention, FIG. 1 shows a portion of a well-known auxiliary power unit (APU), generally designated 10, to which an exemplary embodiment of the present invention is applied. As wellknown, the APU 10 includes a gas turbine engine which is not shown, except for a gearbox 12 located at its one end. The APU 10 also includes a generator 14 (specifically, a starter generator in this instance) connected to the gearbox 12 and a seal plate 16 installed between the gearbox 12 and generator 14. As best seen in FIG. 2, the seal plate 16 is correctly installed in a tight-fitting sealing relationship of a hermetic type between facing end surfaces 12a, 14a (as best seen in FIGS. 7-10) of the gearbox 12 and generator 14, ensuring a leak-free containment of lubricating/cooling oil within this portion of the APU 10.

Figure 3:
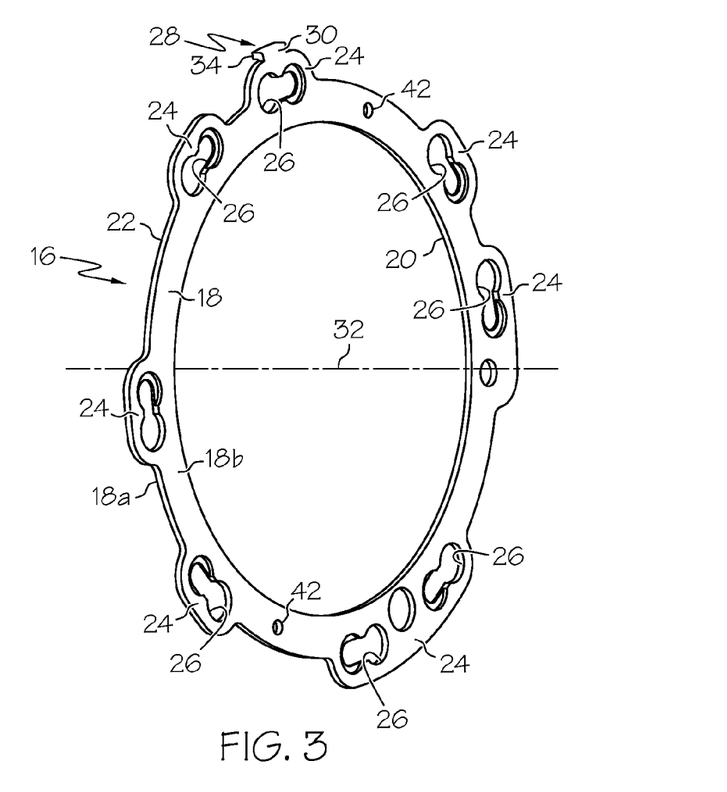
FIG. 3 is a perspective view of the seal plate prior to installation in the auxiliary power unit of FIG. 1, showing the seal plate having two of the plurality of elements in accordance with the present invention for preventing an incorrect installation of the seal plate between the components of the auxiliary power unit.
Figure 4:
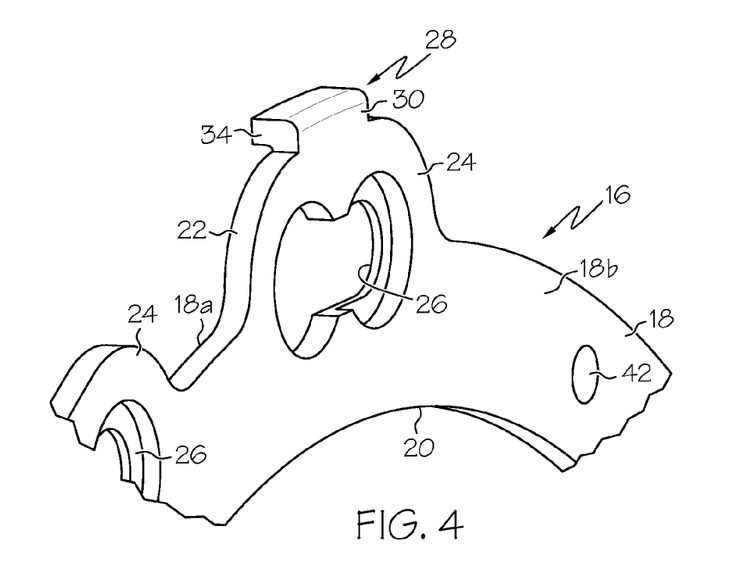
FIG. 4 is an enlarged fragmentary view of the seal plate in FIG. 3 in which the two elements shown thereon are an angular tab protruding from and laterally beyond the outer peripheral edge of the seal plate and a pin-receiving hole extending fore and aft through the seal plate.

FIGS. 3 and 4 show the seal plate 16 by itself prior to installation in the APU 10. The seal plate 16 typically is comprised of a flat or planar, thin, ring-like body 18, made of aluminum, with a suitable gasket material bonded into its opposite seal faces 18a, 18b to provide a positive hermetic oil seal around the various connections between the gearbox 12 and generator 14. The seal plate body 18 may also have an overall annular shape or configuration and is provided with radially spaced apart inner and outer peripheral edges 20, 22. The seal plate body 18 may further have a plurality of embossment portions 24 formed thereon adjacent to the outer peripheral edge 22 thereof and defining apertures 26 for receiving through the body 18 a plurality of fasteners (not shown), such as bolts, used conventionally in connecting the gearbox 12 and generator 14 together with the seal plate 16 between them in the sealing relationship.

Referring now to FIGS. 1-6, in accordance with the present invention the seal plate 16 may have an element for preventing incorrect installation of more than one seal plate 16 between the gearbox 12 and generator 14 of the APU 10. This element may be an axial or angular tab 28 on the outer peripheral edge 22 of the seal plate body 18. In the illustrated embodiment, the angular tab 28 is provided on one of the embossment portions 24 of the seal plate body 18 forming a portion of the outer peripheral edge 22 of the seal plate 16. However, the tab 28 can be provided elsewhere on the outer peripheral edge 22 of the body 18. The angular tab 28 may be fabricated during the fabrication of the seal plate 16 so that the angular tab 28 is rigidly or fixedly attached on the outer peripheral edge 22. The angular tab 28 may also be purposefully provided with an overall bent configuration and a predetermined length such that it protrudes radially outwardly from the seal plate outer peripheral edge 22 and then laterally past the one opposite face 18a of seal plate body 18.

Figure 5:
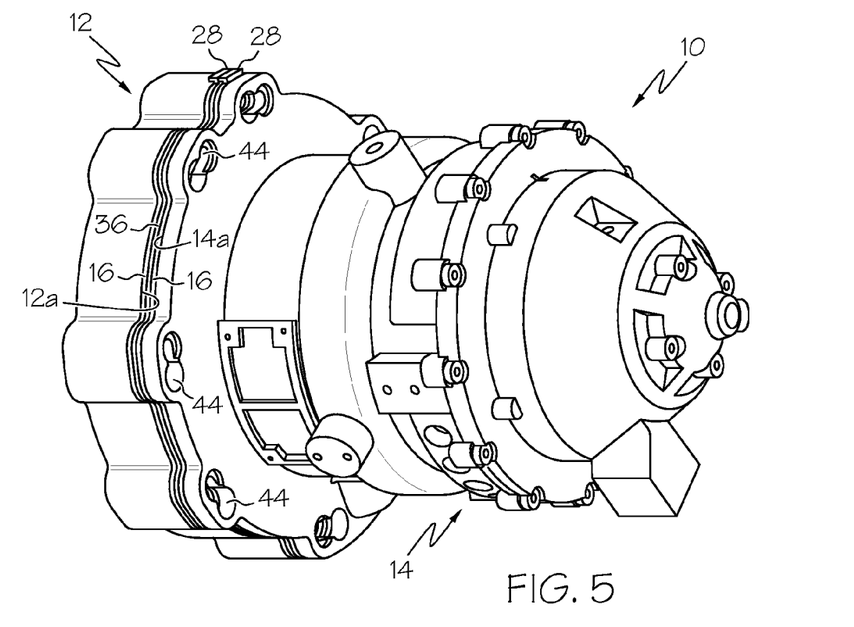
FIG. 5 is a fragmentary perspective view of an auxiliary power unit showing an incorrect installation of two seal plates between the gearbox and generator of the unit which due to interfering contact between their respective angular tabs produces a visible gap between the seal plates which serves to alert an operator of the incorrect installation.
Figure 6:
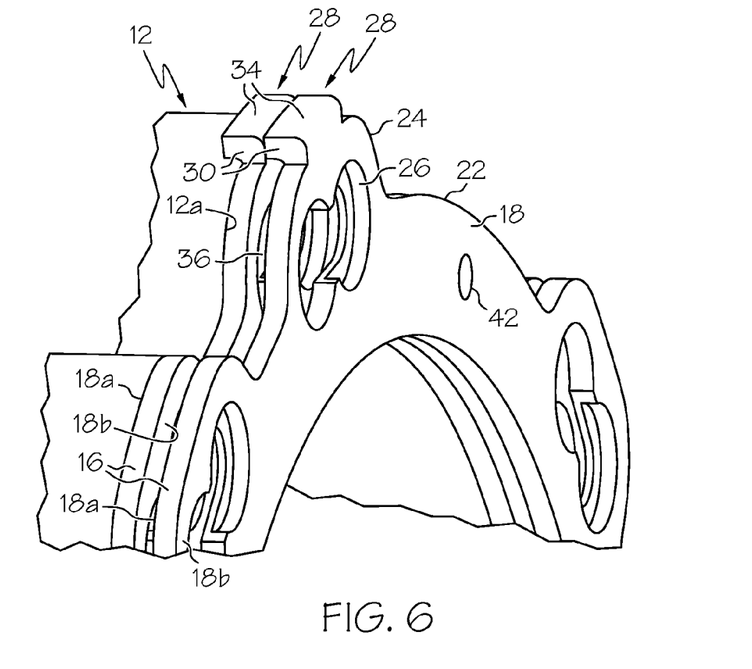
FIG. 6 is an enlarged fragmentary view of the auxiliary power unit in FIG. 5 showing the two seal plates and the visible gap produced between them.

More particularly, the angular tab 28 may have an inner radial portion 30 merging from the outer peripheral edge 22 of the seal plate 16 such that it protrudes radially outwardly, relative to a central axis 32 of the seal plate 16, to beyond the exterior of the adjacent gearbox 12. The angular tab 28 may also have an outer axial portion 34 that merges from the inner radial portion 30 and may be turned approximately ninety degrees relative thereto so as to extend in orthogonal relation to the inner radial portion 30 along the exterior of the gearbox 12 in the direction away from the generator 14. (Alternatively, the angular tab 28 could be fabricated such that its outer axial portion 34 extends in the opposite direction toward the generator 14.) Sufficient clearance may be provided between the gearbox exterior and outer axial portion 34 of the tab 28 such that the tab 28 will not contact the gearbox 12 nor interfere with the correct installation of a single seal plate 16 between the gearbox 12 and generator 14. However, if an incorrect installation of multiple seal plates 16 is attempted between the gearbox 12 and generator 14 the outer axial portion 34 of the tab 28 on one seal plate 16 may contact and interfere with the inner radial portion 30 of the tab 28 on the adjacent seal plate 16, as shown in FIGS. 5 and 6, so as to prevent substantial portions of the adjacent faces 18b, 18a of the seal plates 16 from touching one another. In such manner, a visible gap 36 may be produced between the adjacent seal plates 16 which will alert an operator that appropriate corrective action is needed.

Figure 7:
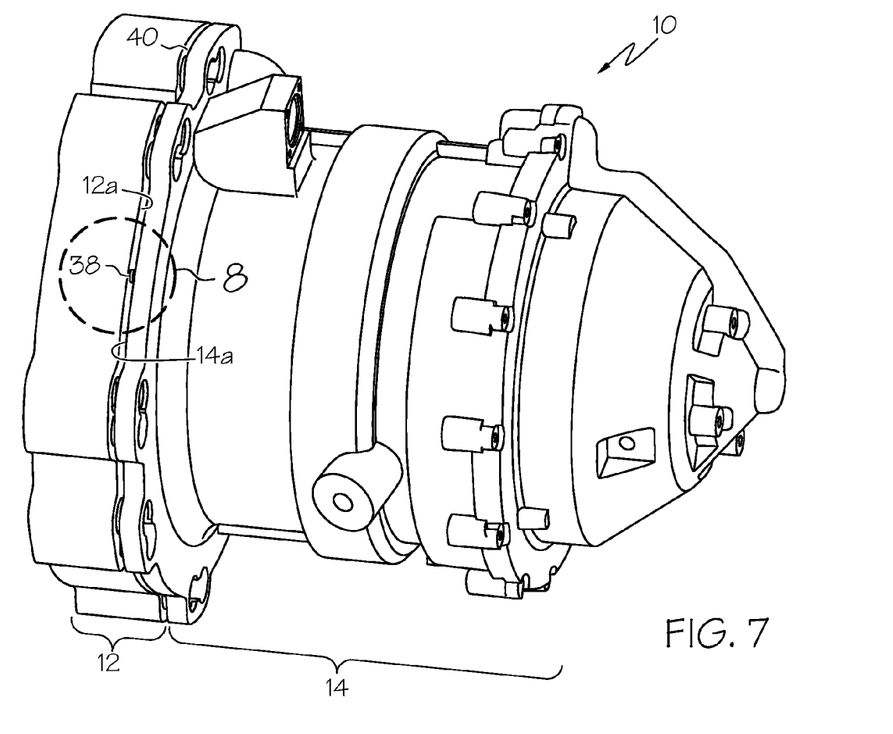
FIG. 7 is another fragmentary perspective view of an auxiliary power unit rotated counterclockwise approximately 90° from the position of the unit in FIGS. 1 and 5 in which an incorrect installation of the gearbox and generator of the unit is shown which is due to the absence of a seal plate between them causing another element on one of the facing surfaces of the gearbox or generator to produce a visible gap between the gearbox and generator which serves to alert an operator of the incorrect installation.
Figure 8:
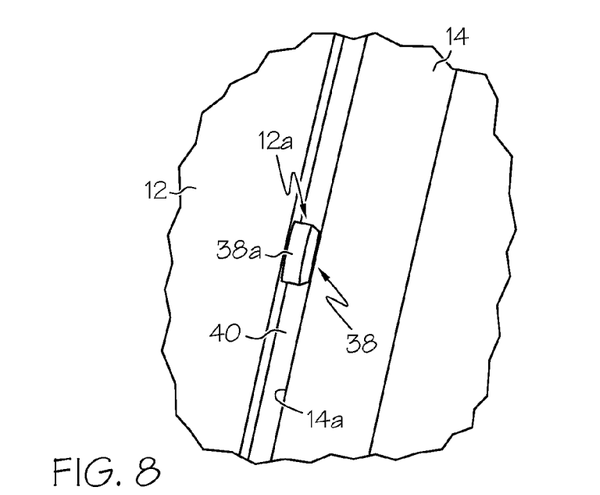
FIG. 8 is an enlarged fragmentary side view of a segment of an auxiliary power unit segment encompassed by circle A in FIG. 7 in which the another element is a pin mount on and protruding from a facing surface of the gearbox into contact with a facing surface of the generator with the seal plate missing.

Also, in accordance with the present invention, the gearbox 12 may have an element for preventing incorrect installation of the gearbox 12 and generator 14 in a faulty sealing relationship together without the seal plate 16. Referring to FIGS. 7-10, this element may be a pin 38 made of any suitable material, for example steel. The pin 38 may be installed in the end surface 12a of the gearbox 12 facing the one opposite face 18a of the seal plate 16. (Alternatively, the pin 38 could be installed in the end surface 14a of the generator 14.) The pin 38 can be installed by using any suitable known technique such as drilling and tapping a threaded hole therein. An exposed portion 38a of the pin 38 may protrude from the end surface 12a of the gearbox 12 and may contact the adjacent facing end surface 14a of the generator 14 if an attempt is made to incorrectly install the gearbox 12 and generator 14 together without a seal plate 16. Thus, the pin 38 may prevent an incorrect installation of these machinery components together in a faulty sealing relationship without the seal plate 16 installed between them, due to contact by the pin 38 with the facing surface 14a of the generator 14 that produces a visible gap 40, as seen in FIGS. 7 and 8, between these machinery components. The presence of the visible gap 40 will alert the operator that appropriate corrective action is needed.

Figure 10:
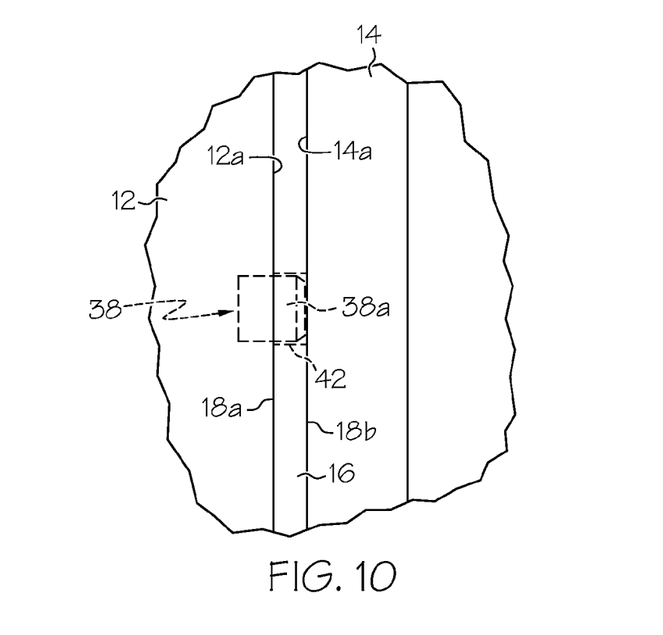
FIG. 10 is a view similar to FIG. 8 but with the seal plate present and the pin seated in the pin-receiving hole in the seal plate.

Further, in accordance with the present invention, the seal plate 16 may have another element for accommodating the presence of the pin 38 when a single seal plate 16 is correctly installed between the gearbox 12 and generator 14. As seen in FIGS. 3 and 4, a pin-receiving hole 42 may be formed through the seal plate body 18 at a location corresponding to the location of the pin 38 on the adjacent end surface 12a of the gearbox 12. The respective axial lengths of the hole 42 and the protruding portion 38a of the pin 38 may be such that when the seal plate 16 is correctly installed against the adjacent facing end surface 12a of the gearbox 12, the protruding portion 38a of the pin 38 may remain within the hole 42 in the seal plate 16, as seen in FIG. 10. Thus, the pin 38 may not protrude past the opposite face 18b of the seal plate 16 and interfere with correct installation the gearbox 12 and generator 14 in the sealing relationship with one seal plate 16 between them.

In order that the seal plate 16 can only be installed in one orientation, the plurality of apertures 26 in the seal plate 16 can be provided in an asymmetrical arrangement, as seen in FIG. 2, to prevent the seal plate 16 from being fitted the wrong way around or incorrectly in a reverse orientation. The embossment portions 24 may be located asymmetrically relative to the central axis 32 of the seal plate body 18 such that the seal plate 16 can be installed only in one orientation between the machinery components whose mounting holes 12b, 14b also are asymmetrically arranged.

While the above description describes the present invention used with respect to the APU 10, the present invention may be used in any circumstance where two components are joined together. The two components may be, as described above, a gearbox and generator of an APU, or may be other components, such as a gearbox and generator of a main engine of an aircraft.

Figure 9:
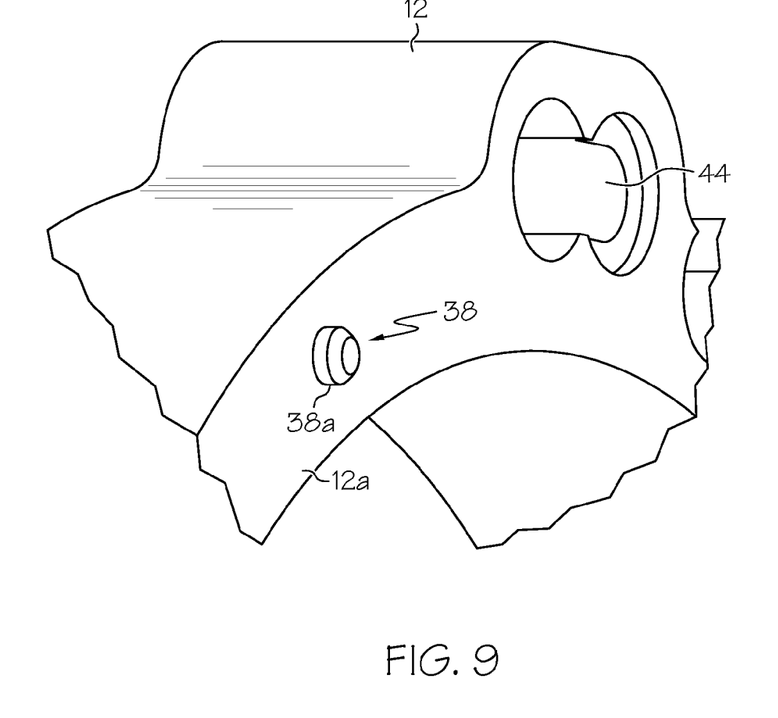
FIG. 9 is an enlarged fragmentary view of the pin shown in FIG. 8.

Alternatively, in the situation where the mounting holes 44 of the machinery components are symmetrically arranged, the pin 38 and the pin-receiving hole 42, as seen in FIGS. 4, 8 and 9, can be provided asymmetrically about the axis 32 of the seal plate 16. Thus, the pin 38 and hole 42 can serve dual functions or purposes, the first being to ensure only one seal plate 16 is installed and the second being to ensure the correct orientation of the seal plate 16.

It should be understood, of course, that the foregoing relates to exemplary embodiments of the invention and that modifications may be made without departing from the spirit and scope of the invention as set forth in the following claims.

We claim:

1. An apparatus comprising:
   an installed seal plate having a tab thereon, the seal plate fitting between a first machinery component and a second machinery component, the tab projecting from an outer periphery of an embossment portion disposed at an outer peripheral edge of the seal plate, wherein
   the first machinery component and the second machinery component interact with one another to form a visible gap therebetween when the otherwise installed seal plate is not installed between the first machinery component and the second machinery component;
   the tab consisting essentially of an inner radial portion that merges from an outer peripheral edge of the seal plate and an outer axial portion that merges from the inner radial portion and is turned to extend in orthogonal relation to the inner radial portion along an exterior of, but not in contact with, either the first machinery component or the second machinery component,
   wherein the outer axial portion extends beyond a periphery of the first and second machinery components,
   wherein sufficient clearance is provided between an exterior of the first machinery component or the second machinery component and the outer axial portion of the tab such that the tab does not contact the first machinery component or the second machinery component; and
   the tab preventing installation of an additional seal plate between the first and second machinery components.

2. The apparatus of claim 1, further comprising a pin mounted on and protruding axially from an adjacent facing surface of the first machinery component facing the installed seal plate.

3. The apparatus of claim 2, further comprising a pin-receiving hole extending fore and aft through the installed seal plate, the pin-receiving hole receiving the pin within it when the installed seal plate is correctly installed in a sealing relationship with the first and second machinery components.

4. The apparatus of claim 1, further comprising a plurality of embossment portions on the installed seal plate defining apertures for receiving a plurality of fasteners connecting the first and second machinery components together with the installed seal plate therebetween in a sealing relationship, the embossment portions being located asymmetrically relative to a central axis of the installed seal plate.

5. The apparatus of claim 1, further comprising a pin mounted on and protruding axially from an adjacent facing surface of the second machinery component facing the installed seal plate.

6. The apparatus of claim 5, further comprising a pin-receiving hole extending fore and aft through the installed seal plate receiving the pin therewithin when the installed seal plate is correctly installed in the sealing relationship with respective adjacent facing surfaces of the first and second machinery components.

7. The apparatus of claim 6, wherein the pin and the pin-receiving hole are located asymmetrically relative to a central axis of the machinery components and the installed seal plate.

8. A seal plate for sealing between two machinery components, the seal plate comprising:
   a body having a planar annular configuration and radially spaced apart inner and outer peripheral edges;
   a pair of oppositely facing seal faces defined on the body between inner and outer peripheral edges of the seal plate; and
   an angular tab fixedly attached to and protruding radially outwardly from an embossment portion disposed at the outer peripheral edge on the body and laterally beyond one of the seal faces, wherein:
   the tab consisting essentially of an outer axial portion that merges from an inner radial portion and has a planar orientation different from a planar orientation of the radial portion, wherein the outer axial portion extends beyond a periphery of the two machinery components; and
   the tab preventing installation of an additional seal plate between the two machinery components.

9. The seal plate of claim 8, further comprising:
   a plurality of embossment portions formed on the body adjacent to the outer peripheral edge thereof and defining apertures for receiving, through the body, a plurality of fasteners for connecting the machinery components together with the seal plate between therebetween, wherein the embossment portions are located asymmetrically relative to a central axis of the body.

10. The seal plate of claim 8, further comprising a pin-receiving hole formed through the seal plate corresponding to a pin on at least one of the machinery components.

11. The seal plate of claim 10, wherein an axial length of the pin-receiving hole and a portion of the pin protruding from the at least one of the machinery components are such that when the seal plate is installed between the machinery components, the pin will remain within the pin-receiving hole thus allowing the machinery components and the seal plate to be installed in a sealing relationship.

* * * * *